United States Patent [19]
Noh

[11] Patent Number: 6,103,862
[45] Date of Patent: Aug. 15, 2000

[54] ALIGNMENT FILM MATERIAL FOR A LIQUID CRYSTAL CELL AND A METHOD FOR PREPARING THE SAME

[75] Inventor: Seong-hee Noh, Suwon-si, Rep. of Korea

[73] Assignee: Samsung Display Devices Co., Ltd., Rep. of Korea

[21] Appl. No.: 09/000,904

[22] Filed: Dec. 30, 1997

[30] Foreign Application Priority Data

Dec. 31, 1996 [KR] Rep. of Korea ................... 96-78689
Oct. 10, 1997 [KR] Rep. of Korea ................... 97-51972

[51] Int. Cl.[7] ................... C08G 73/10; B32B 27/00; G02F 1/1335; G02F 1/141
[52] U.S. Cl. ................... 528/332; 528/310; 528/312; 528/321; 528/322; 528/331; 528/335; 528/336; 428/1; 428/474.4; 427/384; 349/123; 349/124; 349/126; 349/127; 349/131; 349/134
[58] Field of Search ................... 349/123, 124, 349/126, 127, 131, 134; 428/474.4, 1; 528/310, 321, 312, 322, 331, 332, 335, 336; 427/384

[56] References Cited

U.S. PATENT DOCUMENTS

| | | | |
|---|---|---|---|
| 3,049,518 | 8/1962 | Stephens | 528/331 |
| 3,977,767 | 8/1976 | Okuma et al. | 350/150 |
| 4,618,514 | 10/1986 | McClelland et al. | 428/1 |
| 5,327,271 | 7/1994 | Takeuchi et al. | 359/1 |
| 5,527,649 | 6/1996 | Sato et al. | 430/7 |

*Primary Examiner*—P. Hampton-Hightower
*Attorney, Agent, or Firm*—Christie, Parker & Hale, LLP

[57] ABSTRACT

A novel compound of N-substituted aromatic polyamide is prepared by introducing an aralkyl group to the N-position of an aromatic polyamide by metalizing the aromatic polyamide, then reacting the metalized polyamide with an aralkyl halide.

13 Claims, No Drawings

ALIGNMENT FILM MATERIAL FOR A LIQUID CRYSTAL CELL AND A METHOD FOR PREPARING THE SAME

BACKGROUND OF THE INVENTION

(1) Field of the Invention

The present invention related to a novel alignment film material for a liquid crystal cell and a method for preparing the same and, more particularly, to N-aralkyl substituted poly-m-phenylene isophthalamide (PMIA) derivatives of formula 1 which produce a low pretilt angle of less than 1° when the derivatives are applied as a material for an alignment film of the liquid crystal cell, and the method for preparing the same.

[Formula 1]

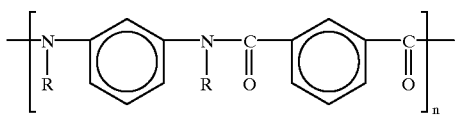

(wherein, R is an aralkyl group.)

(2) Description of the Related Art

Generally, a liquid crystal cell comprises two rigid substrates and liquid crystal materials injected therebetween. Also, a transparent electrode is formed on the substrate so as to apply an electric field to a pixel of the liquid crystal cell, and an alignment film is formed on the transparent film so as to align the liquid crystal material between the substrates.

In order to obtain the electro-optical effect of the liquid crystal cell, uniform alignment of the liquid crystal materials in the liquid crystal cell is needed. There are two types of the liquid crystal alignment, one is a homogeneous alignment and the other is a homeotropic alignment. The homeotropic alignment aligns the liquid crystal material vertically relative to the substrate surface by depositing SiOx or by coating a surfactant such as a silane based coupling agent on the substrate. The homogeneous alignment aligns the liquid crystal material substantially horizontally relative to the substrate, and performed by a conventional slanted evaporating method of silicone dioxide ($SiO_2$), a rubbing method, and a Langmuir-blodgett method.

The rubbing method is the most widely used method for aligning the liquid crystals, and comprises the steps of coating polyimide to form an organic alignment film on the substrate and rubbing the alignment film mechanically. By the rubbing process, a lot of micro-grooves are produced on the surface of the alignment film in the rubbed direction. Thus, when liquid crystal is placed on the rubbed alignment film, the liquid crystal is aligned due to the micro-grooves.

Generally, polyimide has been used predominantly as the liquid crystal alignment film material for the rubbing method because of its good liquid crystal aligning property and chemical stability. Furthermore, polyimide is easily printed on the substrate and rubbed. The process for preparing the polyimide alignment film on the substrate comprises the steps of reacting a diamine compound with an acid anhydride in a solvent so as to produce a polyamic acid solution; coating 4–8% solution of the polyamic acid on a substrate; and baking the substrate in a furnace at 180° C.–300° C. The thermoplastic polyimide film obtained by above-process is represented by the formula 2.

[Formula 2]

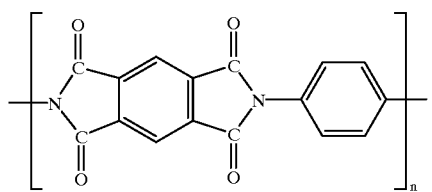

However, there is a disadvantage in that the method requires annealing of the coated precursor, polyamic acid, to form a thin polyimide film. In addition, the polyimide can not produce a pretilt angle of less than 1° which is required in an IPS (In-Plane Switching) mode liquid crystal cell recently introduced for a wide viewing angle.

SUMMARY OF THE INVENTION

Therefore, it is an object of the present invention to provide an alignment film having a low pretilt angle of less than 1°.

It is another object of the present invention to provide a novel material which is soluble to an organic solvent and forms an alignment film easily.

It is further object of the present invention to provide a novel material to form an alignment film which can be used in the IPS (In-Plane Switching) mode liquid crystal cell.

To achieve the above objects, the present invention provides N-aralkyl substituted aromatic polyamide represented by the formula 1, and the process for preparing the same comprising the steps of metalizing an aromatic polyamide and reacting the metalized polyamide with an aralkyl halide.

[Formula 1]

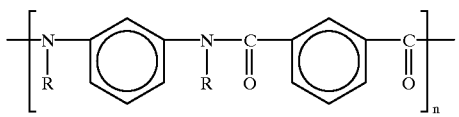

wherein R is an aralkyl group.

DETAILED DESCRIPTION OF THE INVENTION

In the following detailed description, only the preferred embodiment of the invention has been shown and described, simply by way of illustration of the best mode contemplated by the inventor of carrying out the invention. As will be realized, the invention is capable of modification in various obvious respects, all without departing from the invention. Accordingly, the description is regarded as illustrative in nature, and not as restrictive.

The present invention provides an N-aralkyl substituted aromatic polyamide of the following formula 1, and also provides a process for preparing the same comprising the steps of metalizing an aromatic polyamide and reacting the metalized polyamide with an aralkyl halide.

[Formula 1]

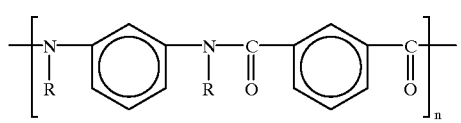

wherein, R is an aralkyl group.

The aromatic polyamide is preferably PMIA (poly-m-phenylene isophthalamide). The step of metalizing is preferably performed by reacting the poly-m-phenylene isophthalamide with methylsulfinyl carbanion. The aralkyl halide is selected from the group consisting of compounds of the formulas 3 to 7.

[Formula 3]

[Formula 4]

[Formula 5]

[Formula 6]

[Formula 7]

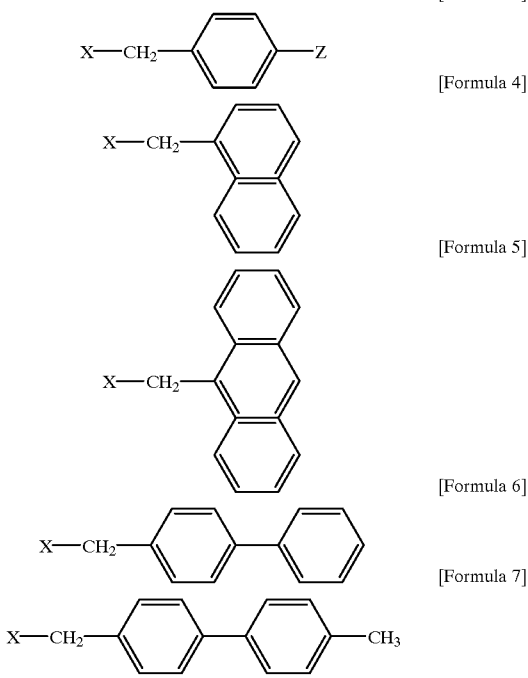

wherein, X is a halogen atom, such as Cl or Br, and Z is H, $CH_3$, CN, $OCH_3$, or $CF_3$. More preferably, the aralkyl group is a benzyl group.

The process for preparing an N-aralkyl substituted aromatic polyamide of the formula 1 will be described in detail. First, methylsulfinyl carbanion was prepared by reacting sodium hydrate (NaH) with dimethylsulfoxide (DMSO). Then, as shown in the reaction formula 1 below, PMIA, an aromatic polyamide material, was metalized with the methylsulfinyl carbanion for 5–6 hours. Afterward, the metalized PMIA was reacted with an aralkyl halide for 12–16 hours, so that the N-position of an amide group of the metalized PMIA main chain is substituted by the aralkyl group. As a result, the N-aralkyl substituted PMIA of the present invention was prepared.

[Reaction Formula 1]

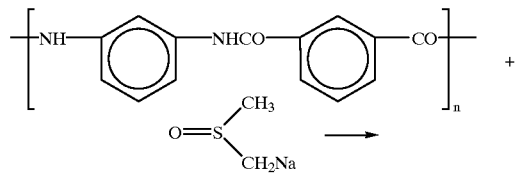

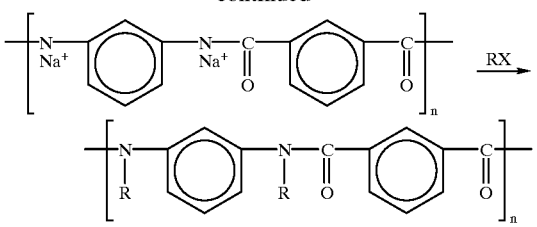

wherein, R is an aralkyl group, and X is Cl or Br.

The above reaction was carried out with a high substitution rate of over 85%, and a high yield of 78% even though it was a polymerization reaction. The N-aralkyl substituted PMIA was analyzed by an element analyzer, NMR and IR. The N-aralkyl substituted PMIA is soluble in an organic solvent such as NMP(N-methyl-2-pyrrolidone), DMSO (dimethyl sulfoxide), THF(tetrahydrofuran) or benzyl alcohol, although the non substituted PMIA is insoluble in organic solvents.

Further, a liquid crystal cell was manufactured after forming the alignment film with the derivatives. That is, an alignment film was formed on a substrate by coating the derivative and NMP solution, and baking the substrate at about 150–180° C. for 1 hour so as to obtain an alignment film. Then, the alignment film was rubbed with a rayon roll. The substrate was assembled with another substrate, and liquid crystal was injected therebetween. Thereby, the liquid crystal is orderly aligned with a pretilt angle of below 1°. By observing the cell with a polarizing microscope, it is shown that the pretilt angle was substantially less than 1°. For example, the pretilt angle was 0.50–1° if a benzyl group was introduced as the aralkyl group, and the pretilt angle is appropriate for an IPS mode liquid crystal cell. Therefore, the IPS mode liquid crystal cell having a wide viewing angle is manufactured by adapting the alignment film of this invention. The derivatives of this invention are soluble in an organic solvent such as NMP, THF, DMSO, or benzyl alcohol. Also, the alignment film formed with the derivative provides a low pretilt angle of less than 1°, so it can be utilized in an IPS mode liquid crystal cell which provides a wide viewing angle.

In this disclosure, only the preferred embodiment of the invention is shown and described, but, as aforementioned, it is to be understood that the invention is capable of use in various other combinations and environments and is capable of change or modification within the scope of the inventive concepts as expressed herein.

What is claimed is:

1. A method for preparing N-aralkyl substituted aromatic polyamide of the following formula, comprising the steps of:

metalizing an aromatic polyamide; and reacting the metalized polyamide with an aralkyl halide,

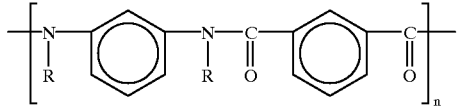

(wherein, R is an aralkyl group).

2. The method according to claim 1, wherein the aromatic polyamide is poly-m-phenylene isophthalamide.

3. The method according to claim 1, wherein the aralkyl halide is selected from the group consisting of the compounds of formulas 3, 4, 5, 6 and 7:

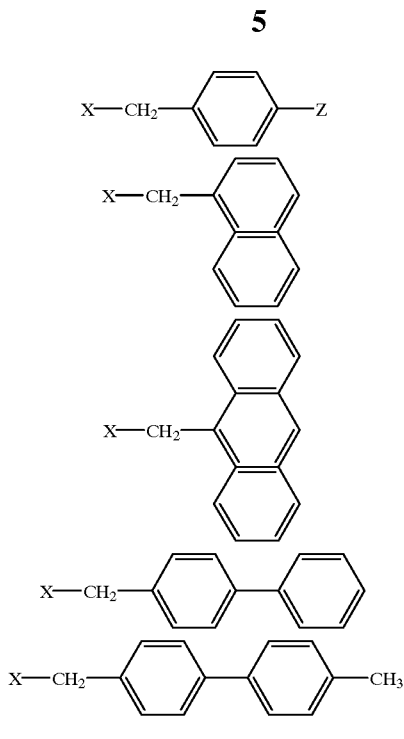

Formula 3

Formula 4

Formula 5

Formula 6

Formula 7 wherein, X is Cl or Br, and Z is H, CH$_3$, CN, OCH$_3$, or CF$_3$.

4. The method according to claim 1, wherein the aralkyl halide is a benzyl halide.

5. A method for manufacturing an alignment film of liquid crystal cell, comprising the steps of:

metalizing an aromatic polyamide;

reacting the polyamide with an aralkyl halide so as to produce an N-aralkyl substituted aromatic polyamide of formula 1;

melting the N-aralkyl substituted aromatic polyamide in an organic solvent so as to produce an alignment solution;

coating the alignment solution on a substrate; and rubbing the substrate.

[formula 1]

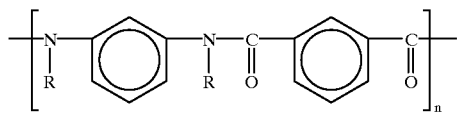

wherein, R is an aralkyl group.

6. The method according to claim 5, wherein the aromatic polyamide is poly-m-phenylene isophthalamide.

7. The method according to claim 5, wherein the aralkyl halide is selected from the group consisting of the compounds of formulas 3, 4, 5, 6, and 7:

Formula 3

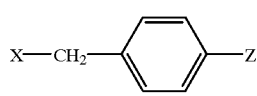

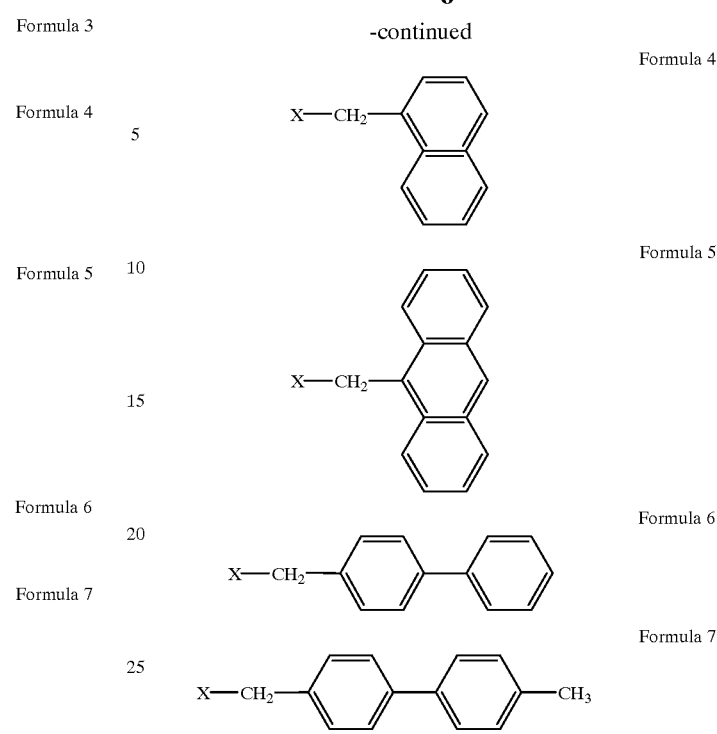

-continued

Formula 4

Formula 5

Formula 6

Formula 7 wherein, X is Cl or Br, Z is H, CH$_3$, CN, OCH$_3$, or CF$_3$.

8. The method according to claim 5, wherein the aralkyl halide is a benzyl halide.

9. The method according to the claim 5, wherein the organic solvent is selected from the group consisting of NMP, DMSO, THF and benzyl alcohol.

10. The method according to claim 5, wherein the alignment film of liquid crystal cell produces a pretilt angle of below 1°.

11. An alignment material for a liquid crystal cell comprising an N-aralkyl substituted aromatic polyamide of the following formula.

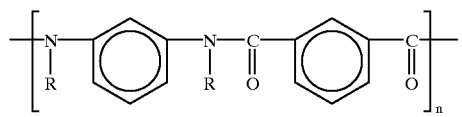

wherein, R is an aralkyl group.

12. The alignment material according to claim 11, wherein the aralkyl group R is selected from the group consisting of compounds of formulas 3, 4, 5, 6 and 7:

Formula 3

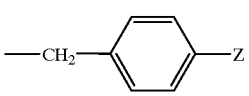

Formula 4

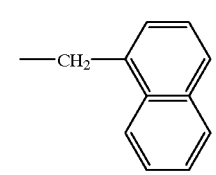

Formula 5
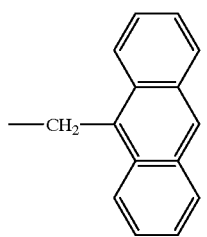
Formula 6
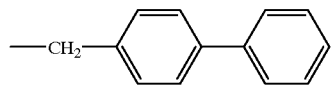
Formula 7
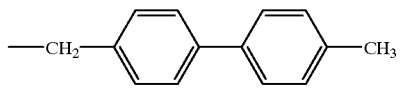
wherein z is H, $CH_3$, $OCH_3$, or $CF_3$.
13. The alignment material according to claim 11, wherein the aralkyl group is a benzyl group.
* * * * *

UNITED STATES PATENT AND TRADEMARK OFFICE
CERTIFICATE OF CORRECTION

PATENT NO.   : 6,103,862
DATED        : August 15, 2000
INVENTOR(S)  : Seong-hee Noh Page 1 of 1

It is certified that error appears in the above-identified patent and that said Letters Patent is hereby corrected as shown below:

<u>Column 8,</u>
Line 10, replace "wherein z is H, $CH_3$, $OCH_3$, OR $CF_3$." with -- wherein Z is H, $CH_3$, CN $OCH_3$, OR $CF_3$. --.

Signed and Sealed this

Twenty-first Day of May, 2002

Attest:

Attesting Officer

JAMES E. ROGAN
*Director of the United States Patent and Trademark Office*